Feb. 2, 1954

H. TUNICK 2,668,232

FREQUENCY CONTROLLING SYSTEM

Filed May 15, 1945

3 Sheets-Sheet 1

INVENTOR.
HARRY TUNICK
BY
H. S. Grover
ATTORNEY

Feb. 2, 1954 H. TUNICK 2,668,232

FREQUENCY CONTROLLING SYSTEM

Filed May 15, 1945 3 Sheets-Sheet 2

INVENTOR.
HARRY TUNICK
BY
H. S. Grover
ATTORNEY

Feb. 2, 1954 H. TUNICK 2,668,232

FREQUENCY CONTROLLING SYSTEM

Filed May 15, 1945

3 Sheets-Sheet 3

INVENTOR.
HARRY TUNICK
BY H. S. Grover
ATTORNEY

Patented Feb. 2, 1954

2,668,232

UNITED STATES PATENT OFFICE 2,668,232

FREQUENCY CONTROLLING SYSTEM

Harry Tunick, Rye, N. Y., assignor to Radio Corporation of America, a corporation of Delaware Application May 15, 1945, Serial No. 593,956

3 Claims. (Cl. 250—17)

The object of my present invention is to provide an improved automatic frequency controlling system especially useful for maintaining a frequency modulation transmitter within its assigned channel.

In accordance with one form of my present invention, I frequency modulate an oscillation generator with a control wave of substantially constant amplitude, phase and frequency. The oscillator is additionally modulated with a modulation band of frequencies and, hence, the control tone is chosen so as to lie below or above the modulating frequency band. Waves derived from the frequency modulated oscillator are fed into a sharply resonant system. The response of this system is to produce a wave of variable amplitude which reverses in phase as the mean frequency of operation of the oscillator under control passes through the resonant frequency of the sharply resonant system. The wave of varying amplitude is detected in an amplitude modulation detector and combined in a phase detector with waves of constant frequency derived from the control source. The output of the phase detector is used to correct the frequency of the frequency modulated oscillation generator so as to operate at a specified or predetermined, that is a desired, mean frequency of operation. It will be noted, as will be explained more fully hereinafter, that the controlling output of the phase detector is zero when the mean frequency of operation of the frequency modulated oscillator is correct and reverses in polarity when the mean frequency of operation of the frequency modulated oscillator passes through or changes from one side to another of the desired frequency of operation.

As required by law, my invention is defined with particularity in the appended claims. However, its more detailed structural organization and mode of operation may better be understood by referring to the following more detailed specification together with the accompanying drawings wherein:

Figure 1:
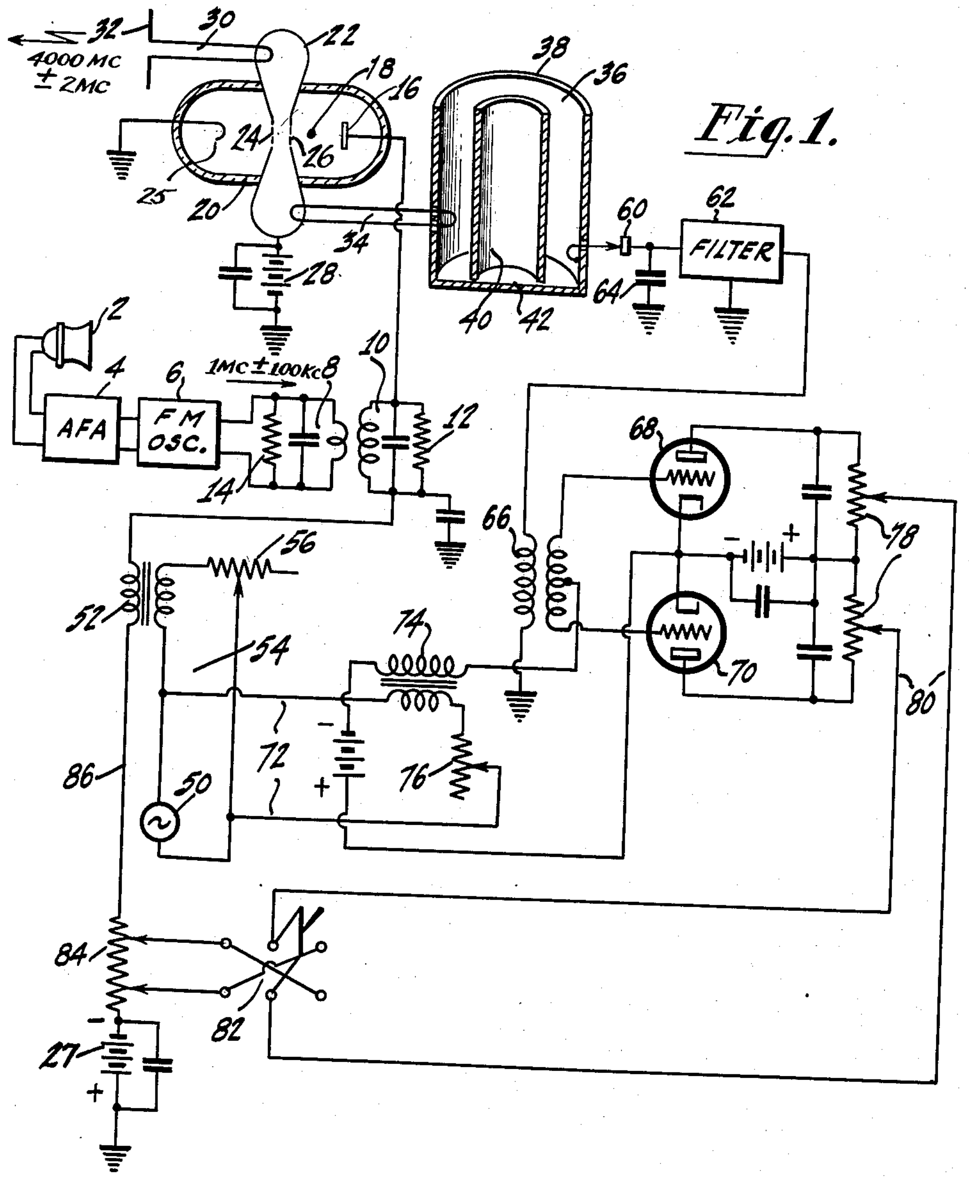
Figure 1 illustrates the application of my present automatic frequency controlling system to a transmitter employing successive frequency modulations.
Figure 2:
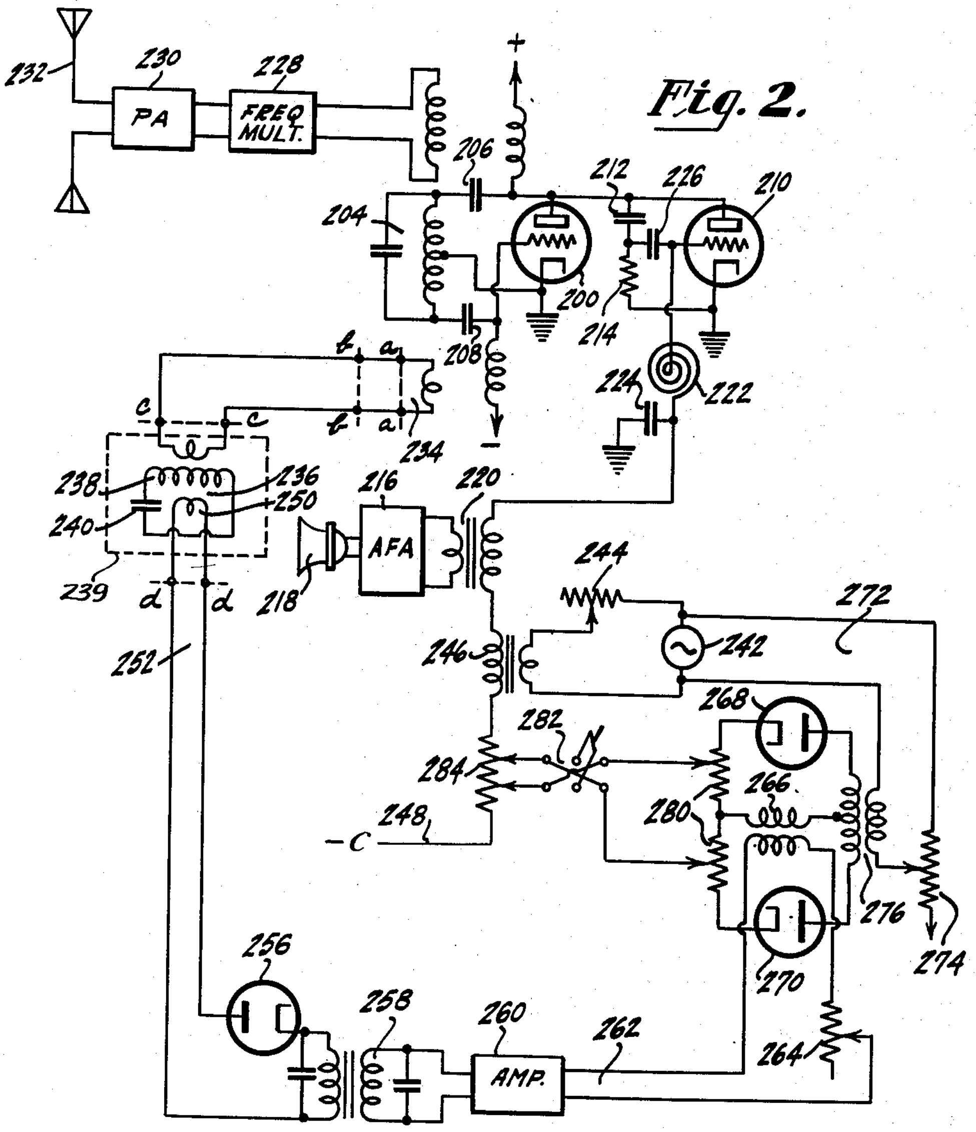
Figure 2 is a modification wherein the transmitter employed radiates a wave having a single signal frequency modulation.
Figure 4:
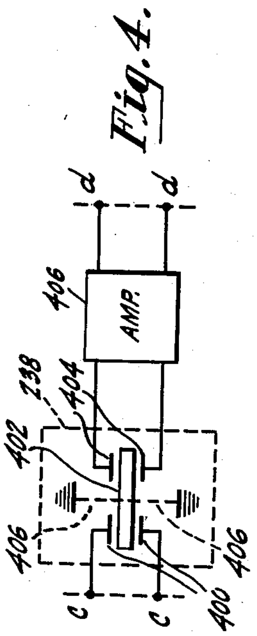
Figure 5:
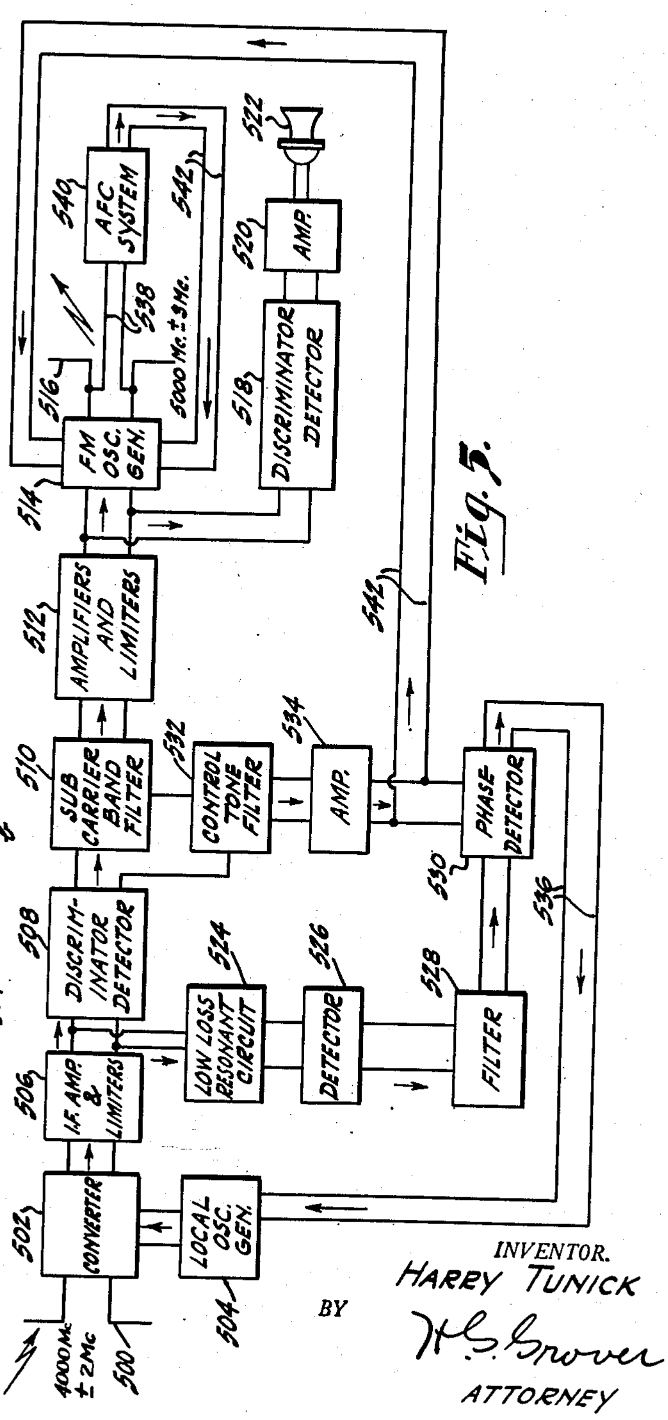

Figure 4 illustrates the manner in which a piezo-electric crystal tank circuit or filter may be substituted for the low loss parallel tuned resonant tank circuit of Figure 2; and Figure 5 is a schematic block diagram of a radio receiving and relaying system useful in conjunction with the transmitting arrangement of Figure 1 and making use of the method and system of automatic frequency control involved in Figure 1.

In Fig. 1 I have illustrated schematically and in wiring diagram form, an ultra short wave frequency modulated transmitting system making use of my improved automatic frequency controlling arrangement. Signals picked up by microphone 2 are amplified in audio frequency amplifier 4 and fed to a sub-carrier frequency modulated oscillation generator 6. The output of frequency modulated sub-carrier oscillator 6 may be a 1 megacycle wave having a maximum swing of plus and minus 100 kilocycles and this frequency modulated sub-carrier wave is resonated in the tuned circuit 8, made suitably flat over the operating band of frequencies by resistor 14. For a more complete description of oscillator 6 reference is made to the sub-carrier generating and frequency modulating system 102, 25 and 100 of Fig. 1 of the copending application of Leland E. Thompson, Serial Number 576,453, filed February 6, 1945, now Patent No. 2,514,425 dated July 11, 1950, and also to the more specific wiring diagram and description of Fig. 4 of said Thompson application.

The frequency modulated sub-carrier is fed through tuned circuit 10 suitably broadened by a resistor 12 so as to have a flat frequency amplitude characteristic over the desired operating range. The frequency modulated waves appearing in circuit 10 are fed to the repeller electrode or plate electrode 16 of a reflex oscillator system 18 in order to frequency modulate the high frequency wave output of oscillator 18.

It will be noted that the reflex oscillator 18 makes use of a hermetically sealed container 20 hermetically sealed to a metallic resonator 22 having a gap covered over by grid structures 24 and 26. It will be appreciated that the cavity resonator 22 is in the form of a toroid.

Also within the container 20 are an electron emitting cathode 25 and the plate or reflector 16. The latter is maintained at a negative potential with respect to ground by means of the condenser bypassed source of potential 27. The toroid is maintained at a positive potential with respect to ground by means of the source of poential 28. As a consequence, electrons emitted from the cathode 25 are attracted to the toroid and pass through the grids 24, 26 only to approach the negatively charged repeller electrode 16. The electrons are then reversed in direction and again pass through the grids of the toroidal cavity 22. Since free electrons in motion act and produce effects like an electrical current flowing in a conductor, the passage of the electrons within the toroid between the grids 24, 26 cause radiation of waves within the toroid 22. Since the latter is tuned in such a way as to most effectively respond to the radiation setup between and propagated along screens 24 and 26, standing waves of relatively large amplitude are generated within the toroid. These waves have a frequency determined in general by the tuning of the toroid, that is, the dimensions of the toroid and also by the D. C. voltages applied at 28 to the toroid and at 27 to the repeller electrode 16.

Superimposition of the frequency modulated waves in circuit 10 on the voltage from source 27 will cause variation in voltage on the repeller electrode 16, thereby causing frequency modulation of the waves within toroid 22. These frequency modulated waves may have a mean frequency of, for example, 4,000 megacycles. By suitable adjustment of the coupling between tuned circuits 8 and 10 the maximum deviation of the waves in tank 22 may be adjusted to be of the order of plus and minus 2,000,000 cycles. A portion of the frequency modulated waves in toroid 22 is fed through transmission line 30, inductively coupled to the space within the toroid, to a suitable radiating antenna 32.

For automatic frequency controlling purposes another portion of the wave energy in resonator 22 is taken by way of a transmission line 34, inductively coupled to the toroid 22 as shown, and fed to a concentric line, low loss, high Q tank circuit 36. The latter, which is shown in cross section, consists of an outer cylindrical metallic conductor 38 and an inner conductor 40 both mounted upon and directly connected to a metal base 42. Inner conductor 40 is substantially one-quarter wave length long at the operating frequency or mean frequency of operation of reflex oscillator 18.

In order to maintain frequency stability, tank circuit 36, as before explained, is designed so as to be of very low loss. Further it is mounted within a temperature controlled oven (not shown) for maintaining the line at a substantially constant temperature at which the line is resonant at the desired frequency of operation.

By means of a relatively low frequency oscillator 50 operating at, for example, 1,000 cycles and by means of transformer 52, line 54 and potentiometer 56, the repeller 16 is additionally modulated at 1,000 cycles. Potentiometer 56 is adjusted so that the 1,000 cycle modulation appearing in the waves generated in toroid 22 has a frequency deviation such as plus and minus 25,000 cycles lying well within the first significant side bands produced by the action of oscillator 6 on the high frequency output radiated over antenna 32.

In the output circuit of crystal detector 60, inductively coupled to tank 36, waves of the second harmonic of the source 50 will appear when the mean frequency of reflex oscillator 18 corresponds in tuning to the resonant frequency of tank 36. These second harmonic oscillations and oscillations of higher frequency are filtered off to ground by filter 62, it being noted that bypass condenser 64 is merely a high frequency bypass for the radio frequency components appearing in the output of crystal detector 60. Filter 62 which may also include amplifying stages, however, will pass into the coil 66, the fundamental component appearing in the output circuit of detector 60, namely, a wave corresponding to the fundamental frequency of oscillator 50.

As the mean frequency of reflex oscillator 18 passes through zero beat or through the resonant frequency of tank 36, the fundamental component of the 1,000 cycle waves corresponding to the frequency of generator 50 will reverse in phase in coil 66. These reversals in phase are combined in the balanced detectors 68, 70 with waves of constant amplitude phase and frequency derived from source 50 through transmission line 72, transformer 74 and potentiometer 76.

Current flow in resistor 78 of the balanced phase detector system including tubes 68 and 70, will act to impress across the terminals of the transmission line 80 connected to resistor 78, a voltage which will be zero when the mean frequency of oscillator 18 corresponds to the resonant frequency of tank circuit 36 and which will reverse in polarity as the frequency of reflex oscillator 18 passes through the resonant frequency of tank or concentric transmission line circuit 36. Hence, in the event of drift of the mean frequency of oscillator 18 away from the resonant frequency of tank 36, a correcting voltage will be fed to transmission line 80 at its connection points to resistor 78. This voltage is fed through reversing switch 82 to the resistor 84 in series with the plate supply lead 86. Switch 82 is thrown to that position for which the correcting voltage fed over line 80 to the resistor 84 in the repeller electrode 16-cathode 25 circuit, brings the reflex oscillator 18 back to a mean frequency of operation corresponding to the resonant frequency of tank 36.

It will be noted that for the transmitting system shown in Fig. 1 a receiving arrangement will be required as described in the copending application of Leland E. Thompson heretofore referred to. That is, in order to derive the signal from wave radiated by antenna 32, successive frequency demodulations are required. As a result of the first frequency demodulation, the sub-carrier appearing in circuit 8 will be reproduced as will also the 1,000 cycle controlling wave produced by generator 50. The latter, however, will immediately be filtered out by the following tuned, sub-carrier frequency amplifying and limiting stages and will not appear in the final loud speaker output of the receiver.

In the event that the apparatus of Fig. 1 is to be used without the sub-carrier generator 6, then the output of audio frequency amplifier 4 will be fed directly, by transformer action, into the lead 86. In that event, however, oscillator 50 should be designed so as to operate at a superaudible frequency such as 30,000 cycles per second. This 30,000 cycle wave will be reproduced in a receiver employing a single frequency demodulation system. However, it will be filtered out in the audio frequency stages of the receiver and thus will not be fed into the loudspeaker. In short, in the event that single frequency modulation is employed in the transmitter, oscillator 50 should have a frequency above or below the extreme or limiting frequencies of the modulation band.

In the arrangement shown in Figure 2, a vacuum tube oscillator generator 200 of the Hartley type is illustrated. This oscillator is provided with a tuned tank circuit 204, one end of which is connected through by-pass condenser 206 to the plate of vacuum tube 200 and the other end of tank circuit 204 is connected by way of by-pass condenser 208 to the grid of tube 200. The frequency of oscillations appearing in tank circuit 204 is varied by means of a reactance tube 210 operating as a variable condenser in shunt to the tank circuit 204. That is to say, by virtue of the small condenser 212 having high capacitive reactance and the resistor 214 having relatively low value, quadrature voltage from the plate circuit of tube 200 is impressed on the grid of tube 210, causing the latter to draw a leading or capacitive current. The gain of tube 210 is also controlled by the output of audio frequency amplifier 216 actuated by microphone 218 and coupled to the grid of reactance tube 210 through transformer 220 and radio frequency choke coil 222. It will be understood, of course, that condensers 224 and 226 are merely by-pass condensers. The frequency modulated output of oscillator 200 is fed to frequency multipliers 228, power amplifier 230 and radiating antenna 232. For automatic frequency controlling purposes, a part of the output of tank circuit 204 is fed through the inductive coupling link 234 to a temperature controlled tank circuit 236. The temperature controlling oven in which the tank circuit 236 is mounted is indicated by the dotted lines 239. The tank circuit 236 includes a coil 238 and a condenser 240, both coil 238 and condenser 240 being of very low loss and sharply tuned to the desired mean frequency or mid-frequency of operation of oscillator 200.

As in connection with Figure 1, the oscillator 200 is also frequency modulated by a super-audible source 242 operating at, for example, 20 kc. It is assumed that the upper frequency of the modulation band fed through the audio frequency amplifier 216 is, say, 10,000 or 12,000 cycles. Super-audible frequency waves generated by generator 242 are fed through potentiometer 244 and the secondary of transformer 246 in series with the voltages already present in the grid lead 248 for the grid of reactance tube 210. Potentiometer 244 is so adjusted that the deviation produced by the 20 kc. oscillator 242 in the output of oscillator 200 is of a desirable value such as, for example, plus and minus 5,000 cycles.

A part of the wave energy appearing in the sharply tuned low loss tank circuit 236 is picked off by coupling coil 250 and fed through conductors 252 to the diode rectifier 256. Hence, when the mean frequency of oscillator 200 departs from the peak or resonant frequency of tank 236, a 20 kc. voltage will appear in circuit 258 tuned to this frequency. The voltage appearing in circuit 258 will reverse in phase, depending upon whether the midfrequency of oscillator 200 is above or below the resonant frequency of tank 236. The fundamental frequency picked up by circuit 258 is amplified in a suitable tuned amplifier 260 which selectively passes the waves of 20 kc., but suppresses waves of higher frequency such as the second harmonic of 20 kc. generated by generator 242. The output of amplifier 260 is fed through connections 262 and potentiometer 264 to the transformer 266. The secondary of transformer 266 feeds the output of connections 262 cophaseally or in push-push to the plates of the balanced diode detecting system 268, 270. Another portion of waves derived from generator 242 is fed through connections 272, potentiometer 274 and transformer 276 to the plates of the balanced diode phase detecting system 268, 270 in phase opposition. As a result there appears across the output resistor 280, connected between the cathodes of diodes 268, 270, a voltage which changes in polarity as the frequency of operation of oscillator 200 goes from one side to another of the mean frequency of operation of tank 236. This voltage is fed through a manually operated reversing switch 282 to a resistor 284 in series with the grid lead 248 for rectance tube 210. Switch 282 should be thrown to that position for which the voltage injected into resistor 284 is in such direction as to cause the mean frequency of operation of oscillator 200 to come back to and correspond with the resonant frequency of tank 236. When the frequency of operation of tank 204 corresponds to the resonant frequency of tank 236 second harmonic voltages will be set up in the output of diode 256, but these will be filtered off by the action of circuit 258 and amplifier 260 so that no correcting voltage appears across the cathode resistor 280, thus allowing the oscillator 200 to keep on oscillating at the correct frequency.

Figure 3:
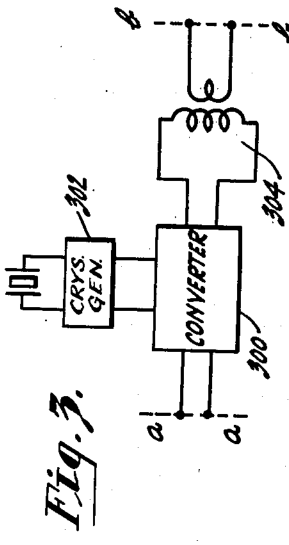
Figure 3 illustrates heterodyning apparatus which may be used in conjunction with the system of Figure 2.

As shown in Figure 3, if desired the link 234 may be broken at points *a*, *a* and *b*, *b* and the apparatus of Figure 3 connected therein. The apparatus of Figure 3 consists of a converter or heterodyne detector 300 fed with oscillations from a crystal controlled oscillation generator 302. The intermediate frequency appearing in tuned circuit 304 is then fed on to the tank 236 which operates at the intermediate frequency. This frequency may be made equal to the difference in frequencies between the crystal controlled oscillator 302 and the desired mid-frequency of operation of oscillator 200 or it may be chosen as the sum of these two frequencies.

The apparatus of Figure 2, whether or not modified in accordance with Figure 3, may employ a crystal instead of the tank circuit 236. One method of making this substitution is shown in Figure 4. The link 234 is broken at *c*, *c* and the connections 252 are broken at *d*, *d*. The tank circuit 236 and its couplings are removed and the apparatus of Figure 4 connected in at points *c*, *c* and *d*, *d*. It will be observed that the oscillations derived from the oscillator 200 are then fed to the electrodes 400 of the crystal 402. The crystal 402 is provided with a pair of output electrodes 404 connected to a suitable amplifier 406 whose output is fed through the terminals *d*, *d* to the diode 256. The input and output electrodes of crystal 402 are shielded from each other by means of the grounded shields 406. Crystal 402 is ground for operation at the desired mid-frequency of oscillator 200 or, in the event that the heterodyning system of Figure 3 is employed, crystal 402 would be ground to have a frequency corresponding to the desired intermediate frequency or tuning of circuit 304. Also, when employing the crystal arrangement of Figure 4, oscillator 242 may be operated at some sub audible frequency such as, for example, 10 cycles per second.

In Figure 5 I have illustrated a combined radio receiving and relaying system making use of the automatic frequency controlling principles heretofore expounded upon in the description of Figures 1 and 2.

A double frequency modulated wave, such as radiated by the transmitting antenna of Figure 1, is picked up by the receiving antenna 500 of Figure 5 and fed to a converter 502. The latter is also supplied with locally generated high frequency oscillations from heterodyning generator or local oscillator 504. The intermediate or difference frequency appearing in the output of converter 502 is amplified and limited in a series of intermediate frequency amplifiers and limiters 506. The output of limiters 506 is fed a discriminator-detector system 508 such as described in the patent of S. W. Seeley, No. 2,121,103. In the output of discriminator-detector 508 will appear the frequency modulated sub-carrier band of frequencies and also the control wave, both of which it will be recalled had been used to frequency modulate the final radiating oscillator or main carrier oscillator of the transmitting system of Figure 1. This control wave is an exact replica of and therefore corresponds in frequency to the wave output of oscillator 50 of Fig. 1.

The band of sub-carrier frequencies appearing in the output of detector 508 of Fig. 5 is filtered out by a suitable filter 510 and amplified and limited in amplifiers and limiters 512.

For relaying purposes the output of amplifiers and limiters 512 is fed to a frequency modulated oscillation generator 514 operating at, for example, a mean frequency of 5,000 megacycles and is deviated a maximum amount of, for example, ±3 megacycles. The output of the frequency modulated oscillation generator 514 is fed to a suitable radiating antenna 516 for relaying on to the next relaying or receiving point.

For local reception of the audio program or modulating signal carried by the waves received upon antenna 500 of Fig. 5, a portion of the output of the amplifiers and limiters 512 is fed to a second frequency modulation discriminator detector 518. In the output of this discriminator, there will appear the original modulation band of frequencies. These are amplified by amplifier 520 and utilized in and translated by loudspeaker 522 or other signal translating device.

In order to maintain the output of converter 502 centrally located with reference to the pass band of intermediate frequency amplifier 506, a portion of the output of amplifier 506 is fed as shown to a low loss resonant circuit 524 sharply tuned to the desired mid-frequency of the intermediate frequency amplifier 506.

From what has been said heretofore in connection with Figures 1 and 2, it should be evident that the output of circuit 524 will be an amplitude modulated wave having a component in its modulation envelope having a frequency equal to the frequency of the control wave supplied by oscillator 50 of Fig. 1. This component reverses in phase as the mean or average frequency of the intermediate frequency output of 506 passes through the resonant frequency of low loss circuit 524. These components are detected in amplitude modulation detector 526 and filtered by filter 528 tuned to pass waves of the control frequency to the phase detector 530.

Phase detector 530 is also fed with a control wave of invariable phase and substantially constant amplitude and frequency from the control tone or wave filter 532 and tuned control wave amplifier 534. It will be noted that filter 532 derives its control wave or tone from the output of the first frequency modulation discriminator-detector arrangement 508.

In the output leads 536 of the phase detector 530, there will appear an automatic frequency controlling voltage which is zero when the intermediate frequency output of converter 502 lies in the middle of the pass band of 506 or has a mean or average frequency exactly in tune with low loss resonant circuit 524. However, the output of phase detector 530 is of finite value and reverses in polarity as the intermediate frequency output of converter 502 becomes unsymmetrical with respect to the resonant or mid-frequency of circuit 524. This automatic frequency controlling voltage is fed over lines 536 to the local oscillation generator 504 in such a way as to bring the intermediate frequency output of converter 502 to a desired frequency value.

It will be noted that a portion of the output of the oscillator 514 of Fig. 5 is fed through leads 538 to an automatic frequency controlling system 540. The frequency controlling system 540 is built in accordance with the arrangement shown in Figure 1 and its output controlling voltages are fed back over leads 542 to automatically correct the frequency of operation of oscillation generator 514. Also, it is to be noted that oscillator 514 is frequency modulated with a control tone or wave fed to it over lines 542 connected to the output of tone amplifier 534. This will enable the use of my improved automatic frequency controlling system at the next receiving and relaying point.

For a detailed description of the apparatus which I prefer to employ for the oscillation generator 504, converter 502, intermediate frequency amplifier 506 and oscillation generator 514 of Figure 5, reference is made to the corresponding apparatus shown and described in the above-mentioned patent to Leland E. Thompson. The heterodyne oscillator and converter are illustrated in detail in Figure 7 of the Thompson application and the radiating frequency modulated oscillation generator is shown in Figure 6 of that application.

The automatic frequency controlling system 540 of Figure 5 is the system which I have described in connection with Figure 1 herein and, accordingly, it need not be described in detail. In the arrangement of Figure 1 the control tone is labeled as a 1,000 cycle tone. If desired, this control tone may be of any suitable frequency and, in fact, may have a frequency of 60 cycles and be derived from ordinary commercial power supply circuits.

In connection with Figure 2 it should be noted that the low loss resonant circuit need not be fed from the tank circuit 204 of the oscillation generator but may, if desired, be fed from the output of the power amplifier or from the output of one of the frequency multiplier stages 228 of the transmitter. Obviously, in that event, the low loss resonant circuit is tuned or designed to have a resonant frequency equal to the desired frequency multiplied output of the master oscillator.

If desired, the system of Figures 1 and 5 may be operated with all of the automatic frequency controlling apparatus located at the receiving terminal. Thus, the automatic frequency controlling arrangement of Figure 1, including the resonant line 36, local control wave oscillator 50 and the phase detecting system involving tubes 68 and 70, could be omitted at the transmitting terminal and brought over to the receiving terminal of Figure 5 to automatically frequency control local generator 504 which may, of course, be identical in construction to the reflex oscillator 18 of Figure 1. In that event, the control tone filter 532 of Figure 5 would be omitted since the phase detector 530 would be supplied with waves from the control oscillator 50 now located at the receiver. Also, the local oscillation generator 504 would be frequency modulated with the oscillator 50. Low loss resonant circuit 524 would be resonant to a desired mid-frequency of the pass band of the I. F. amplifier 506.

Having thus described my invention, what I claim is:

1. A transmitting arrangement for transmitting modulated high frequency oscillations comprising, a source of signal waves, a source of waves of sub carrier frequency, said sub carrier waves having a mean frequency higher than the highest frequency of the signaling waves; a modulating circuit for modulating the waves of sub carrier frequency with the signal waves, a carrier frequency generator generating waves of a frequency suitable for transmission; a modulation circuit for modulating the waves generated by the carrier generator with the modulated sub carrier waves; a source of control waves of substantially invariable frequency amplitude and phase connected to the carrier frequency generator for modulating the same in frequency; a low loss tank circuit coupled to and excited by a portion of the frequency modulated wave output of the carrier generator said low loss circuit being tuned to a fixed frequency; a detector connected to and detecting high frequency waves flowing in said low loss circuit, the output circuit of said detector having therein waves of control frequency reversing in phase as the frequency of the carrier shifts in frequency from one side to another of a desired frequency of operation; a phase detector; circuits for applying to said phase detector said control waves of invariable frequency and control waves derived from the output circuit of said detector; and a circuit utilizing voltages developed by said phase detector to control the frequency of operation of said carrier frequency generator.

2. A frequency controlling system comprising, in combination, a microwave oscillator having a reflector electrode, the frequency of the generated oscillations being variable in accordance with the potential impressed on said electrode, a resonant cavity tuned to a predetermined desired ultra-high frequency of operation of said oscillator, means for supplying oscillations from said oscillator through said cavity, a source of relatively low frequency control voltage waves, means for impressing said control waves on said electrode, thereby to frequency-modulate said oscillations, the amplitude of said control waves being sufficient to vary the frequency of said oscillations over a range extending on either side of said desired frequency, means to detect resultant amplitude modulation waves in the envelope of said oscillations after transmission through said cavity, means to combine said control waves and said modulation waves and to derive a unidirectional potential therefrom, said potential having polarity and magnitude dependent upon deviations in the mean frequency of said oscillations from said predetermined frequency, and means additionally to impress said potential on said electrode in a sense tending to maintain the mean frequency of said oscillations at said predetermined frequency.

3. A frequency controlling system comprising, in combination, a generator of high frequency oscillations having a potential-responsive frequency control element, a resonant circuit tuned to a desired oscillator frequency, means for supplying said oscillations through said circuit, a source of relatively low frequency waves having a substantially constant amplitude, means for supplying said waves to said control element, thereby to frequency-modulate said oscillations over a predetermined frequency band, the amplitude of said control waves being sufficient to vary the frequency of said oscillations over a range extending on either side of said desired frequency, means to detect resultant amplitude modulation waves in the envelope of said oscillations after transmission through said circuit, means to combine said low frequency and modulation waves and to develop a unidirectional control potential therefrom, said potential having polarity and magnitude dependent upon deviations in the mean frequency of said oscillations from said desired frequency, and means additionally to impress said potential on said element in a sense to oppose said deviations.

HARRY TUNICK.

References Cited in the file of this patent

UNITED STATES PATENTS

| Number | Name | Date |
|---|---|---|
| 2,104,801 | Hansell | Jan. 11, 1938 |
| 2,245,685 | Koch | June 17, 1941 |
| 2,270,023 | Ramsay et al. | Jan. 13, 1942 |
| 2,357,984 | Travis | Sept. 12, 1944 |
| 2,377,326 | Crosby | June 5, 1945 |
| 2,400,648 | Korman | May 21, 1946 |
| 2,401,355 | Hysko | June 4, 1946 |
| 2,404,568 | Dow | July 23, 1946 |
| 2,425,013 | Stotz | Aug. 5, 1947 |
| 2,428,265 | Crosby | Sept. 30, 1947 |
| 2,434,293 | Stearns | Jan. 13, 1948 |
| 2,462,857 | Ginzton et al. | Mar. 1, 1949 |
| 2,475,074 | Bradley | July 5, 1949 |

OTHER REFERENCES

Brainerd, "Ultra-High Frequency Techniques," D. Van Nostrand, July 1942, page 207.